Sept. 10, 1968 D. SWAINE ET AL 3,401,301

ADJUSTABLE FOCUS VOLTAGE CONTROL CIRCUIT

Filed June 14, 1966 2 Sheets-Sheet 1

INVENTORS
DEREK SWAINE &
ROBERT C. WHEELER
BY
Robert E. Strauss
ATTORNEY

INVENTORS
DEREK SWAINE &
ROBERT C. WHEELER
BY
Robert E. Strauss
ATTORNEY 3,401,301

ADJUSTABLE FOCUS VOLTAGE CONTROL CIRCUIT

Derik Swaine and Robert Charles Wheeler, Batavia, N.Y., assignors to Sylvania Electric Products Inc., a corporation of Delaware Filed June 14, 1966, Ser. No. 557,478
7 Claims. (Cl. 315—31)

This invention relates to adjustable focus voltage control circuits and more particularly to voltage control circuits for providing an adjustable voltage for application to the focus electrode of a color cathode ray tube utilized in a color television receiver.

Present-day color television receivers usually employ electrostatic focusing of the electron beams of the cathode ray tube and such focusing necessitates a source of relatively high voltage, i.e. 3000 to 5000 volts is commonly used. Also, it is desirable to be able to adjust this high voltage within a limited range in order to compensate for variations in components and voltage sources. Further, it is highly desirable to provide some means for regulating the focus voltage when a shift in the electron beam current of the cathode ray tube occurs during operational use.

Usually, a voltage source is provided by rectifying a transient voltage pulse which appears at the output transformer of the horizontal circuitry when the horizontal output tube is driven to cutoff during the retrace period of the horizontal scan cycle. It is this voltage source which is frequently utilized to provide adjustable focus voltage control circuitry.

The prior art suggests one form of adjustable focus voltage control circuit wherein an inductive means is utilized to couple a diode rectifier and a filter capacitor to the horizontal output transformer. The inductive means is in the form of a voltage step-up transformer whereby variable coupling thereof is utilized to effect an adjustable DC voltage output. In another known arrangement, a diode rectifier and capacitor are connected in series with an adjustable inductance coupled to the horizontal output transformer. Herein, the inductance is varied to cause a variation in the potential applied to the rectifier and capacitor causing a variation in the DC output available from the circuitry.

While inductive coupling provides a power supply wherein power consumption and waste is minimized, such coupling is relatively expensive. Also, circuitry such as mentioned above requires components suitable for operation at relatively high values of potential. Further inductive components in such circuitry are subject to shock excitation by the flyback voltage pulses whereupon undesired ringing occurs. Thus, additional dissipative impedance means are usually provided to inhibit the ringing which adds further complexity and cost to the circuitry.

Other known systems for providing adjustable focus control voltages include altering the charging current through a capacitor to vary the output voltage, varying the amplitude of the pulse voltage applied to the system, and dividing down a fixed output voltage by a system of voltage dividers. However, all of these systems either require expensive components capable of withstanding relatively high potentials, are wasteful of power and develop undesired heat, or provide insufficient range of control potentials.

Therefore, it is an object of this invention to provide an enhanced adjustable focus voltage control circuit suitable for use in a color television receiver.

Another object of the invention is to provide an enhanced adjustable focus voltage control circuit which includes dynamic regulating means and is suitable for use in a color television receiver.

A further object of the invention is to provide an improved adjustable focus voltage control circuit having a minimum of complexity and utilizing relatively inexpensive components.

These and other objects are achieved in one aspect of the invention by providing means for applying a pulse voltage and an alterable DC potential to a rectifier to cause development of a combined rectified pulse voltage and alterable DC potential which is applied to the focus electrode of a color cathode ray tube. Also, provision is made for dynamically altering the selected portion of the alterable DC potential in accordance with variations of the beam current of the color cathode ray tube to provide dynamic regulation as well as adjustable focus control of the potential applied to the focus electrode of the color cathode ray tube.

For a better understanding of the present invention, together with other and further objects, advantages and capabilities thereof, reference is made to the following disclosure and appended claims in connection with the accompanying drawings in which:

Figure 1:
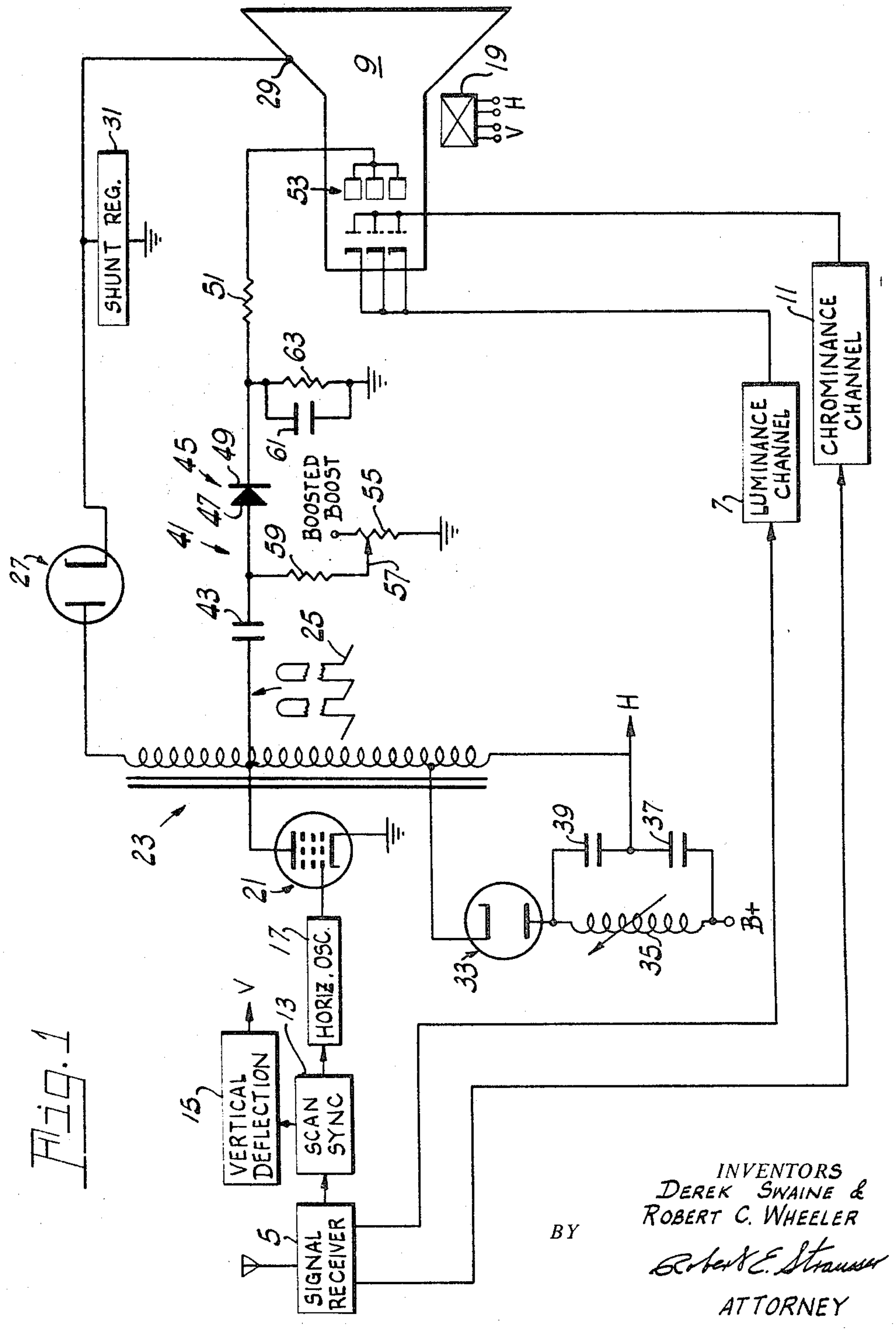
FIG. 1 illustrates, in block and schematic form, a color television receiver employing one embodiment of the invention.

Referring to the drawings, FIG. 1 illustrates a color television receiver including a signal receiver 5 having the usual RF, IF, and video amplification and detection stages. The receiver 5 provides a plurality of output potentials including one output representative of brightness variations of an image which is applied by way of a luminance channel 7 to the cathodes of a color cathode ray tube 9.

Another output from the signal receiver 5 is applied via a chrominance channel 11 to the control grids of the color cathode ray tube 9. As is well known, the chrominance channel 11 separates the chrominance signal from a composite color signal, detects the amplitude and phase of the chrominance signal, and applies the detected signal representative of color information appearing at a viewed scene to the cathode ray tube 9 wherein the viewed scene is reproduced.

Still another output from the signal receiver 5 is applied to a sync separator 13 wherein the synchronizing pulses are separated from the video information. These synchronizing pulses are applied to a vertical deflection circuitry 15 and to a horizontal sweep oscillator 17. The vertical deflection circuitry 15 develops potentials available at the output (V) thereof which are applied to the vertical windings (V) of a deflection yoke 19 and serve to cause displacement of the electron beams in a vertical direction.

The horizontal sweep oscillator 17 develops a trapezoidal potential which is applied to the control grid of a horizontal output tube 21. Therein, a trapezoidal current is developed at the anode and applied to a horizontal output transformer 23. In a well-known manner, the horizontal output tube 21 is driven to cutoff during the period of retrace whereupon the magnetic field of the output transformer 23 collapses causing the development of relatively high amplitude transient voltage pulses 25.

The output transformer 23 is of the autotransformer type whereacross is developed a very high AC potential with respect to ground which is applied to a high voltage rectifier 27 to provide a desired DC potential which is coupled to the second anode 29 of the color cathode ray tube 9. The high DC voltage is regulated by a shunt regulator 31 coupled intermediate the junction of the rectifier 27 and anode 29 and circuit ground. Also associated with the output transformer 23 and coupled thereto is a deflection efficiency circuit including a damper diode 33, a linearity inductor 35, a B-boost capacitor 37, and a filter capacitor 39. This efficiency circuit serves in a well-known manner to dampen the ringing effects resulting from the sudden collapse of the magnetic field of the deflection apparatus 19.

Also coupled to the output transformer 23 is an adjustable focus control circuit 41. This focus control circuit 41 includes a capacitor 43, a rectifier 45 having an anode 47 and cathode 49, and a resistor 51 series connecting the transformer 23 to a focus electrode 53 of the color cathode ray tube 9. An alterable resistor 55 having an adjustable tap 57 couples a voltage source, Boosted Boost, to a voltage reference level with the adjustable tap 57 connected via a resistor 59 to the junction of the capacitor 43 and the rectifier 45. A filter network including a parallel connected capacitor 61 and resistor 63 connects the junction of the rectifier 45 and resistor 51 to a voltage reference level.

As to the operation of the focus control circuit 41, the relatively high amplitude voltage pulses 25 available at the transformer 23 are coupled via the capacitor 43 to the anode 47 of the rectifier 45. Also, a selected portion of the DC potential available from the supply, Boosted Boost, is applied via the alterable resistor 55 and resistor 59 to the anode 47 of the rectifier 45. Thus, the rectified pulse voltage and a selected portion of the DC potential available from the voltage source, Boosted Boost, appear at the cathode 49 of the rectifier 45 and are applied to the focus electrode 53 of the color cathode ray tube 9. Moreover, the combined rectified pulse voltage and selected portion of the DC potential applied to the focus electrode 53 is readily altered by adjustment of the tap 57 of the resistor 55.

It should perhaps be noted that the resistor 59 is preferably in the range of about 10–20 megohms in the embodiment illustrated in FIG. 1. In this manner, the relatively high amplitude voltage pulses 25 are prevented or at least greatly reduced prior to arrival at the alterable resistor 55. Thus, the alterable resistor 55 need not be exposed to relatively high potentials and the cost thereof is minimized.

Figure 2:
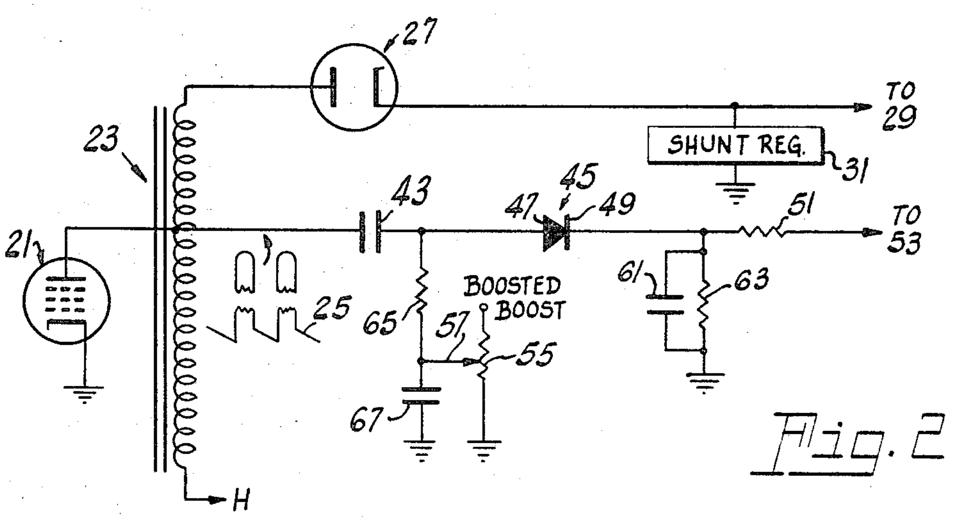
FIG. 2 is a block and schematic illustration of an alternate embodiment of the invention.

FIG. 2 illustrates an alternate embodiment of the focus control circuit 41 of FIG. 1. Utilizing similar numbers for similar components in FIGS. 1 and 2, the voltage pulses 25 available at the output transformer 23 are applied via a capacitor 43 to the anode 47 of the rectifier 45. A selected portion of DC potential available at the adjustable tap 57 is applied via a resistor 65 to the anode 47 of the rectifier 45. Also, a capacitor 67 couples the junction of the resistor 65 and capacitor 67 to a voltage reference level.

The operation of the embodiment of FIG. 2 is similar to the operation of the embodiment of FIG. 1. However, the resistor 65 in the embodiment of FIG. 2 is preferably of a reduced value, i.e. 0.5 to 1.5 megohms. Then, the undesired pulse voltages which would normally appear at the alterable resistor 55 are by-passed to circuit ground via the capacitor 67 whereupon the alterable resistor 55 is not subjected to extreme potentials and again may be a component of relatively low cost.

In still another embodiment of the invention, means are provided for dynamically altering the selected portion of DC potential which is combined with the pulse voltage and applied to a rectifier to provide a potential suitable for application to the focus electrode of the color cathode ray tube. That is to say, the selected portion of DC potential combined with the voltage pulses and applied to the rectifier to provide suitable potentials for application to the focus electrode of a cathode ray tube is dynamically altered in accordance with variations in the high voltage applied to the anode electrode of the cathode ray tube. Thus, in a high voltage regulation system wherein the high voltage applied to the cathode ray tube varies with beam current of the tube, means are provided for varying the potential applied to the focus electrode in proportion to the variations in applied high voltage.

Figure 3:
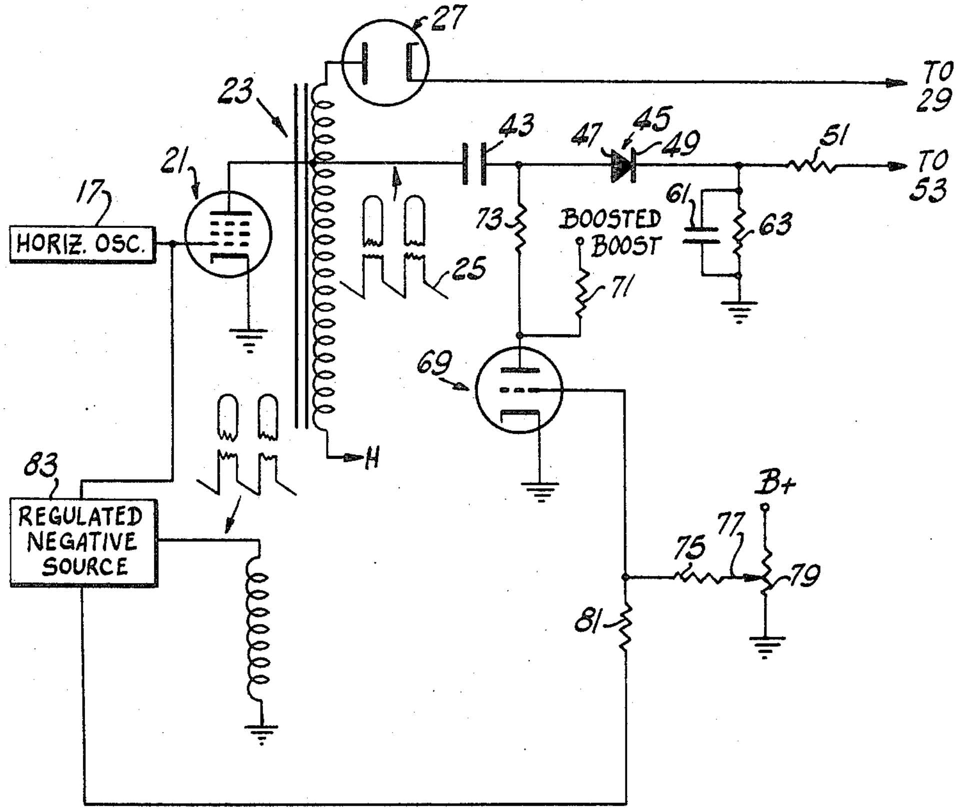
FIG. 3 is a schematic illustration of still another embodiment of the invention.

More specifically, FIG. 3 illustrates a high voltage regulation system wherein the high voltage varies with variations in beam current of the cathode ray tube. In other words, the shunt regulator 31, of FIG. 1, is not present. Using similar numbers for similar parts illustrated in FIGS. 1 and 2, FIG. 3 includes a horizontal oscillator 17 wherefrom a drive signal is applied to a horizontal output tube 21. The anode of the output tube 21 is coupled to a transformer 23 wherein high amplitude transient voltage pulses 25 are developed.

One output from the transformer 23 is coupled via a rectifier 27 to the second anode 29 of the cathode ray tube 9. Another output from the transformer 23 is coupled via a series connected capacitor 43, rectifier 45, and resistor 51 to the focus electrode 53 of the cathode ray tube 9. A filter including a parallel coupled capacitor 61 and resistor 63 is connected intermediate the junction of the rectifier 45 and resistor 51 and circuit ground.

A focus regulator electron device 69 has an output electrode coupled by way of a resistor 71 to a voltage source, boosted boost and via a resistor 73 to the junction of the capacitor 43 and rectifier 45. An input electrode of the electron device 69 is coupled via a resistor 75 to the alterable arm 77 of a resistor 79 coupling a voltage source, B+, to circuit ground. Also, the input electrode of the electron device 69 is coupled via a resistor 81 to a filtered regulating negative potential source, block 83, coupled to the horizontal output tube 21 and transformer 23. Obviously, other regulating potential sources are applicable so long as the potential applied to the alterable resistor 79 is of a polarity to be compatible therewith.

In the operation of the above-described circuitry, an increase in beam current of the cathode ray tube 9 will cause a decrease in high voltage potential applied to the second anode 29. At the same time, the regulating negative potential available from the source 83 tends to go in a less negative or more positive direction as the beam current of the cathode ray tube 9 increases. This less negative or more positive potential available from the source 83 is coupled via the resistor 81 to that portion of DC potential selected by the alterable arm 77 of the resistor 79. This less negative or more positive-going selected DC potential is coupled to the input electrode of the focus regulator electron device 69 which causes an increase in current flow and a reduction in positive voltage at the output electrode thereof. The reduction in positive voltage at the output electrode of the electron device 69 is coupled by way of the rectifier 45 to the focus electrode 53 of the cathode ray tube 9. Thus, a decrease in high voltage potential applied to the second anode 29 is accompanied by a decrease in the selected portion of DC potential combined with the voltage pulses applied to the rectifier 45 with a consequent decrease in potential applied to the focus electrode 53.

Thus, there has been provided an enhanced adjustable focus voltage control circuit adapted for use in color television receivers. The circuit provides the necessary range of focus voltages with a minimum of complexity and cost. Also, the circuit permits the utilization of relatively inexpensive components which are not required to withstand relatively high potentials. Further, the circuitry includes provisions for dynamically regulating the focus voltage in accordance with variations in the potentials applied to the sceond anode of a color cathode ray tube. Moreover, the circuitry provides not only a readily adjustable range of focus voltage but dynamic control thereover within selected range.

While there has been shown and described what are at present considered to be the preferred embodiments of the invention, it will be obvious to those skilled in the art that various changes and modifications may be made therein without departing from the invention as defined by the appended claims.

What is claimed is:

1. In a color television receiver including a color cathode ray tube having a focus electrode, a horizontal output transformer wherein horizontal flyback voltage pulses are developed, and a high voltage source, an adjustable focus voltage control circuit comprising in combination:

a rectifier;

means for coupling horizontal flyback voltage pulses from said output transformer to said rectifier;

means for coupling an alterable DC potential from said high voltage source to said rectifier; and means for coupling a DC potential from said rectifier to said focus electrode of said color cathode ray tube, said DC potential including rectified horizontal flyback voltage pulses and said alterable DC potential from said high voltage source.

2. The adjustable focus voltage control circuit of claim 1 wherein said rectifier includes an anode and a cathode, said means for coupling horizontal flyback voltage pulses from said output transformer includes a capacitor coupling said transformer to the anode of said rectifier, and said means for coupling an alterable DC potential from said high voltage source to said rectifier includes an alterable resistor coupling said high voltage source to a voltage reference level, said alterable resistor having an adjustable tap, and an impedance coupling said tap to said anode of said rectifier.

3. The adjustable focus voltage control circuit of claim 2 wherein a capacitor couples the junction of said adjustable tap and impedance to a voltage reference level to provide a low impedance path for flyback voltage pulses appearing at said junction.

4. The adjustable focus voltage control circuit of claim 2 wherein said means for coupling a DC potential from said rectifier to said focus electrode includes a parallel coupled capacitor and resistor connected intermediate said cathode of said rectifier and a voltage reference level.

5. In a color television receiver having a color cathode ray tube with an anode electrode and a focus electrode, a source of high voltage, a horizontal output transformer wherein pulse voltages are developed providing a potential which is applied to the anode electrode, and voltage regulating means responsive to variations in said pulse voltages, an adjustable focus voltage control circuit comprising in combination:

a rectifier;

means for coupling pulse voltages from said horizontal output transformer to said rectifier;

means for coupling a selected portion of DC potential to said rectifier;

means coupled to said means for coupling a selected portion of DC potential to said rectifier for dynamically altering the magnitude of said selected portion of potential in response to alterations in the magnitude of said pulse voltages; and means for applying the DC potential available from said rectifier to said focus electrode, said DC potential including the rectified pulse voltages and the dynamically altered selected portion of potential applied to said rectifier whereby the potential applied to said focus electrode varies in proportion to the potential applied to said anode electrode of said cathode ray tube.

6. The adjustable focus voltage control circuit of claim 5 wherein said means for coupling pulse voltages from said horizontal output transformer to said rectifier includes a capacitor connecting the transformer and rectifier and said means for coupling a selected portion of DC potential to said rectifier includes an alterable impedance coupled intermediate a source of DC potential and a voltage reference level.

7. The adjustable focus voltage control circuit of claim 5 wherein said means for coupling a selected portion of DC potential to said rectifier includes an electron device coupled to an alterable impedance connected intermediate a voltage source and a voltage reference level.

References Cited

UNITED STATES PATENTS

| | | | |
|---|---|---|---|
| 2,745,986 | 5/1956 | Preisig | 315—22 |
| 2,749,473 | 6/1956 | Nelson | 316—31 X |
| 2,783,413 | 2/1957 | Smith | 315—31 X |
| 2,813,225 | 11/1957 | Dietch | 315—31 X |
| 2,879,447 | 3/1959 | Preisig | 315—31 X |
| 3,339,103 | 8/1967 | Denton | 315—31 |

RODNEY D. BENNETT, *Primary Examiner.*

H. C. WAMSLEY, *Assistant Examiner.*